United States Patent [19]

Blumenshine

[11] 4,372,492
[45] Feb. 8, 1983

[54] SPRAYER BOOM STRUCTURE

[75] Inventor: Richard A. Blumenshine, Blue Springs, Mo.

[73] Assignee: Lely Independence Mfg., Inc., Independence, Mo.

[21] Appl. No.: 235,983

[22] Filed: Feb. 19, 1981

[51] Int. Cl.³ .............................................. A01C 3/04
[52] U.S. Cl. .................................................. 239/168
[58] Field of Search ........................ 239/164, 166–170, 239/172, 175

[56] References Cited

U.S. PATENT DOCUMENTS

| | | | |
|---|---|---|---|
| 3,329,030 | 7/1967 | Dijkhof | 239/167 |
| 3,395,503 | 8/1968 | Greenburg et al. | 239/168 |
| 3,565,340 | 2/1971 | Meinert | 239/168 |
| 3,580,505 | 5/1971 | Loeffler | 239/168 |
| 3,887,132 | 6/1975 | Widmer | 239/166 |
| 3,902,667 | 9/1975 | Jackson | 239/167 |
| 3,927,832 | 12/1975 | Robison et al. | 239/168 |
| 4,044,952 | 8/1977 | Williams et al. | 239/168 |
| 4,106,700 | 8/1978 | Clark | 239/168 |
| 4,138,063 | 2/1979 | Batts | 239/168 |
| 4,197,999 | 4/1980 | Lammers | 239/166 |
| 4,344,572 | 8/1982 | Tyler | 239/168 |

FOREIGN PATENT DOCUMENTS

| | | |
|---|---|---|
| 154595 | 12/1943 | Australia . |
| 549822 | 12/1957 | Canada . |
| 930769 | 7/1973 | Canada . |
| 2656279 | 5/1978 | Fed. Rep. of Germany . |
| 2270774 | 12/1973 | France . |
| 2256714 | 1/1975 | France . |
| 557068 | 11/1943 | United Kingdom . |
| 1425162 | 2/1976 | United Kingdom . |

Primary Examiner—James B. Marbert
Assistant Examiner—Michael J. Forman
Attorney, Agent, or Firm—Litman, Day and McMahon

[57] ABSTRACT

A sprayer boom assembly comprises an elongate spray boom having outwardly foldable wing sections with a center portion pivotally mounted to an upstanding support frame of a transport vehicle for vertical swinging movement as the vehicle traverses uneven terrain. A biasing frame is pivotally mounted to the vehicle frame and the spray boom center section and connected to the spray boom through shock absorbers to dampen shocks and oscillatory movement of the spray boom. The biasing frame is tiltable about the pivot so that the spray boom can be selectively tilted to one side or another while retaining shock absorbing capability in any position. The wing sections include outer and inner wing sections of which the outer wing is automatically foldable against the inner wing through a translational to rotational movement arrangement which is actuated upon folding of the inner wing relative to the center section. The outer wing sections include a swing-away hinge structure for protection upon encountering obstacles during movement of the transport vehicle over a field surface.

9 Claims, 15 Drawing Figures

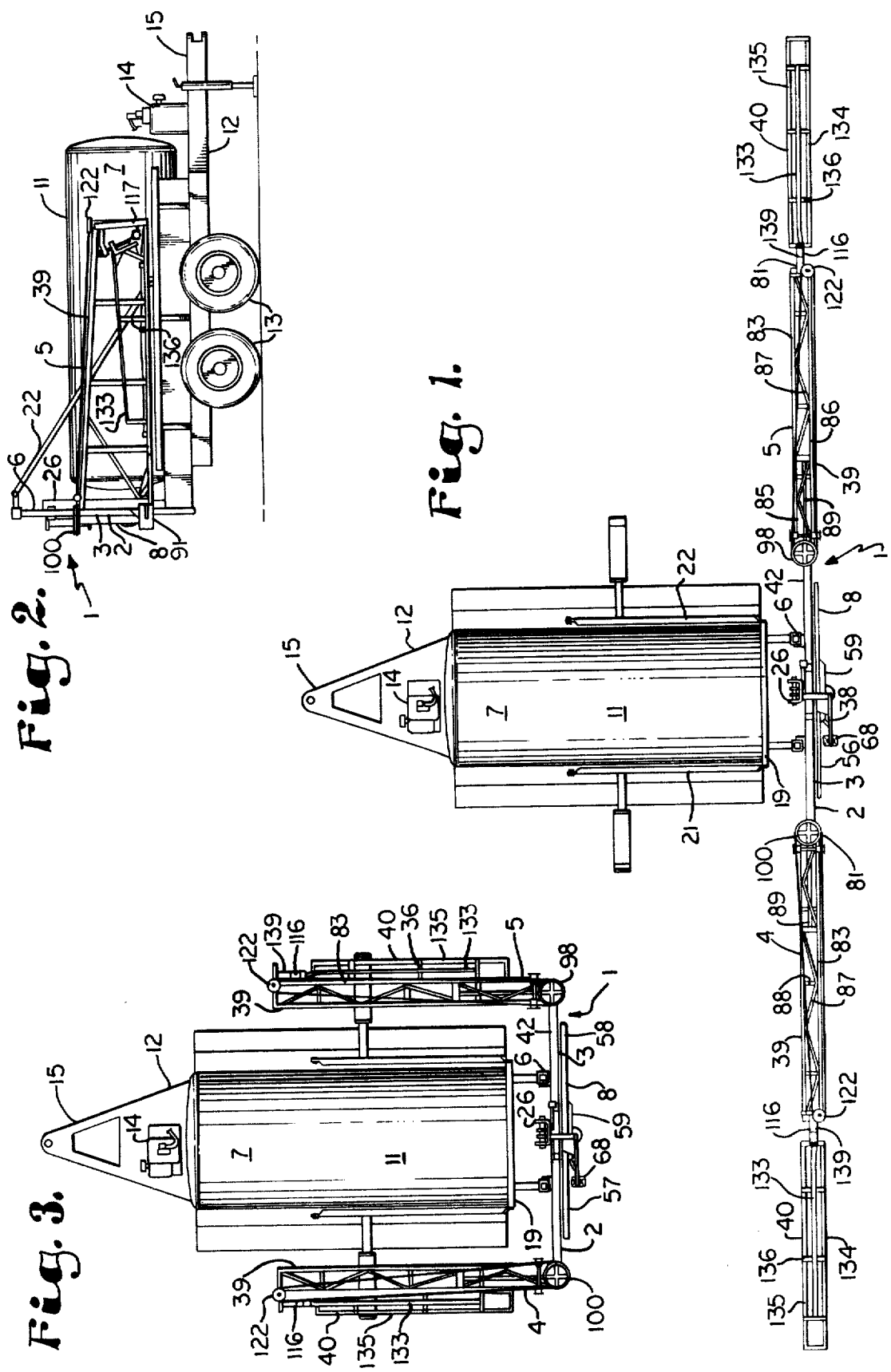

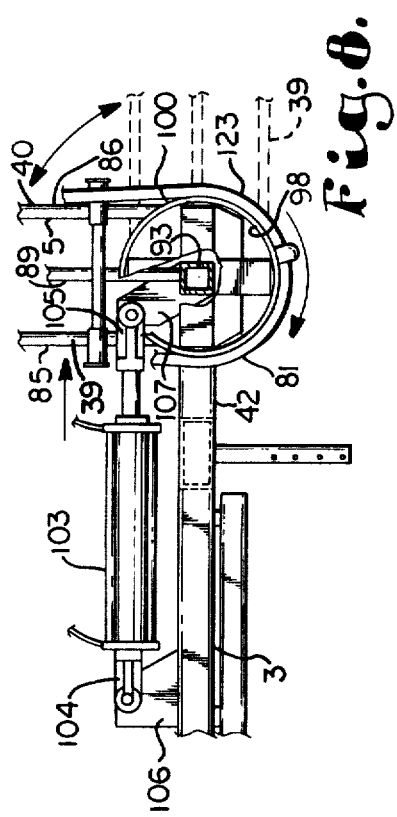
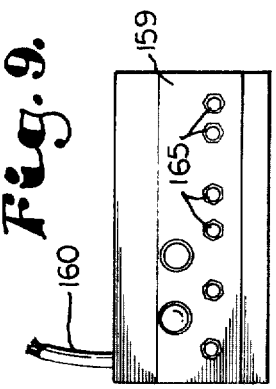
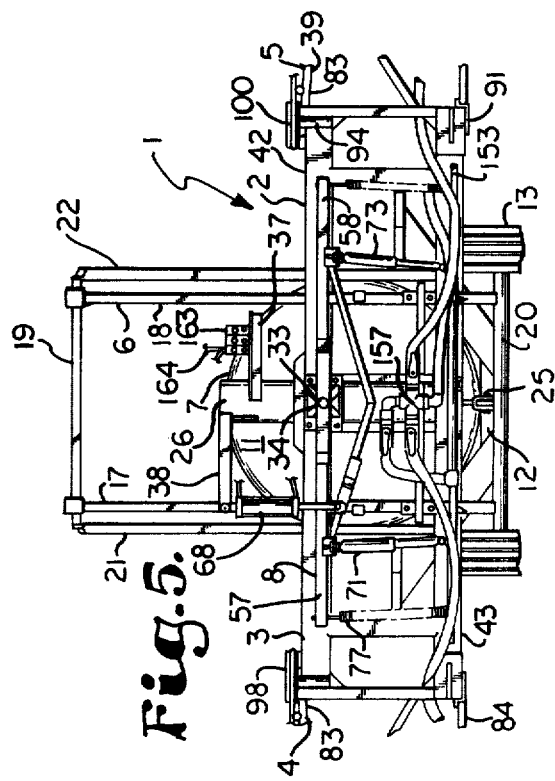
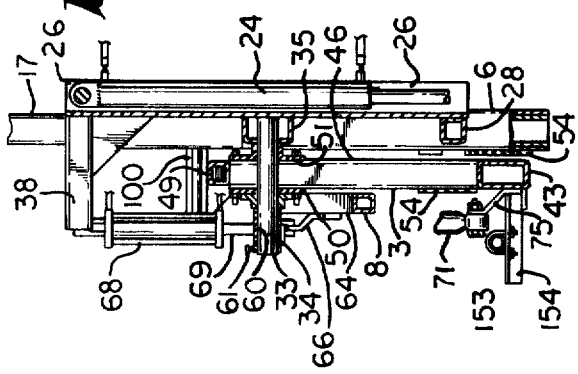
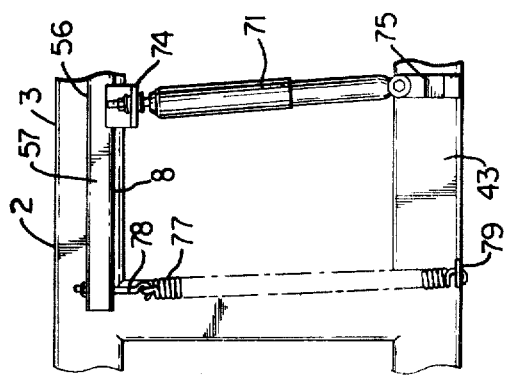

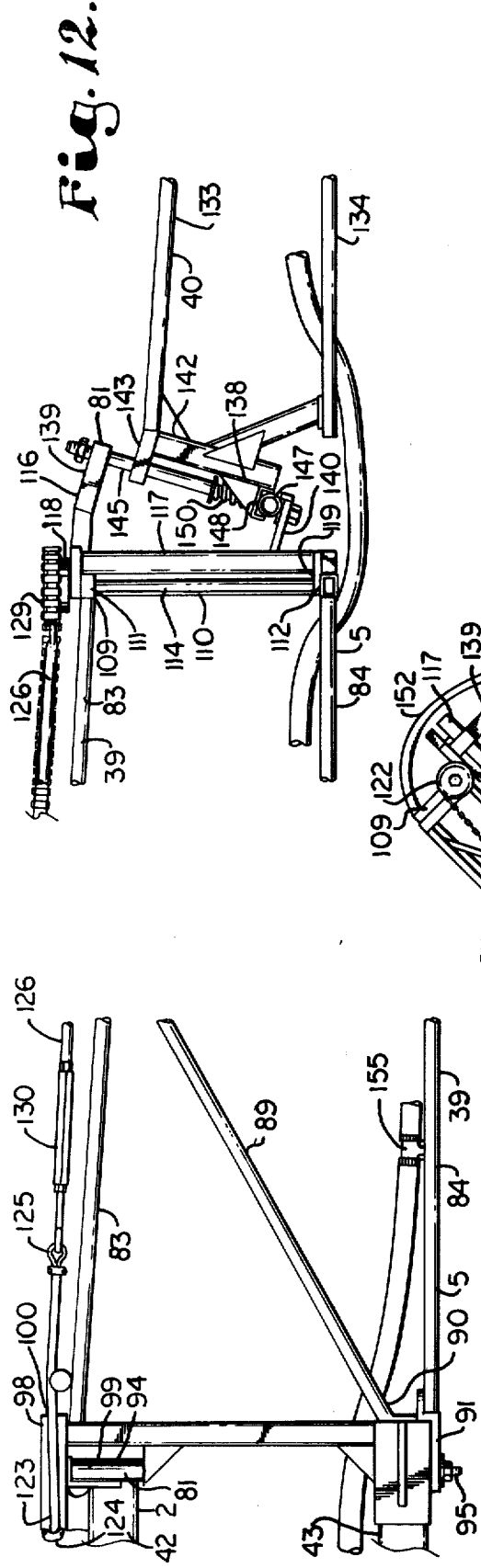
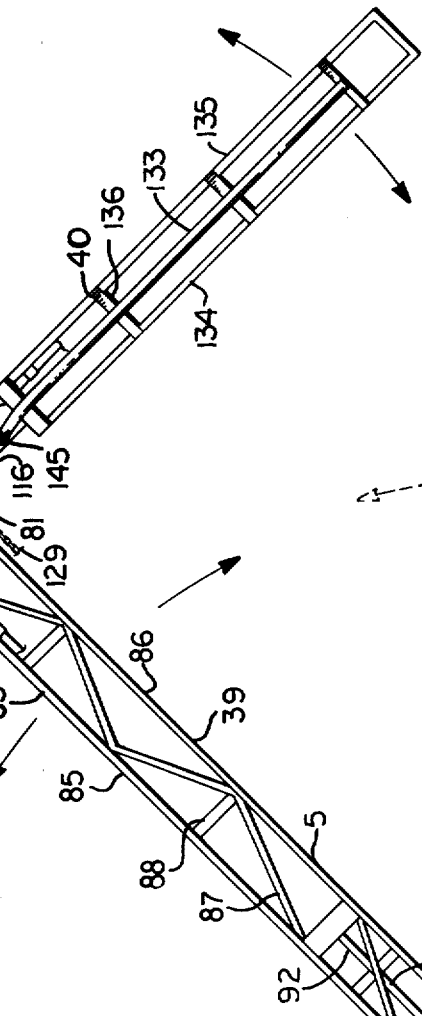
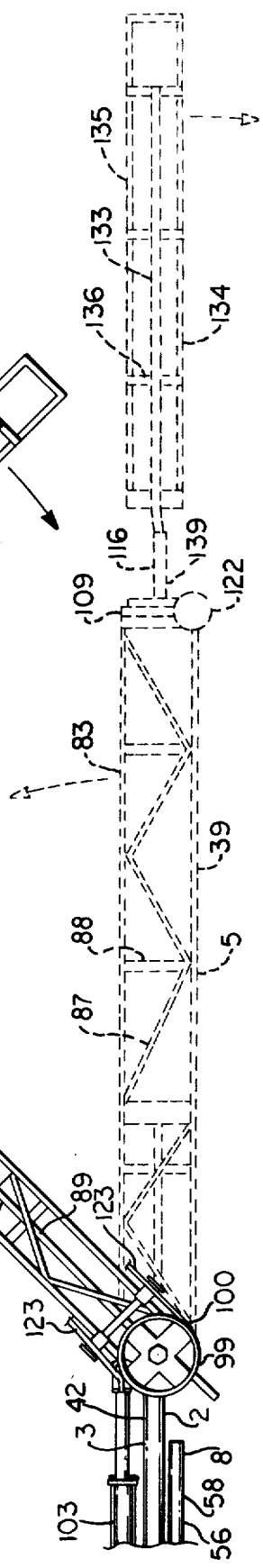

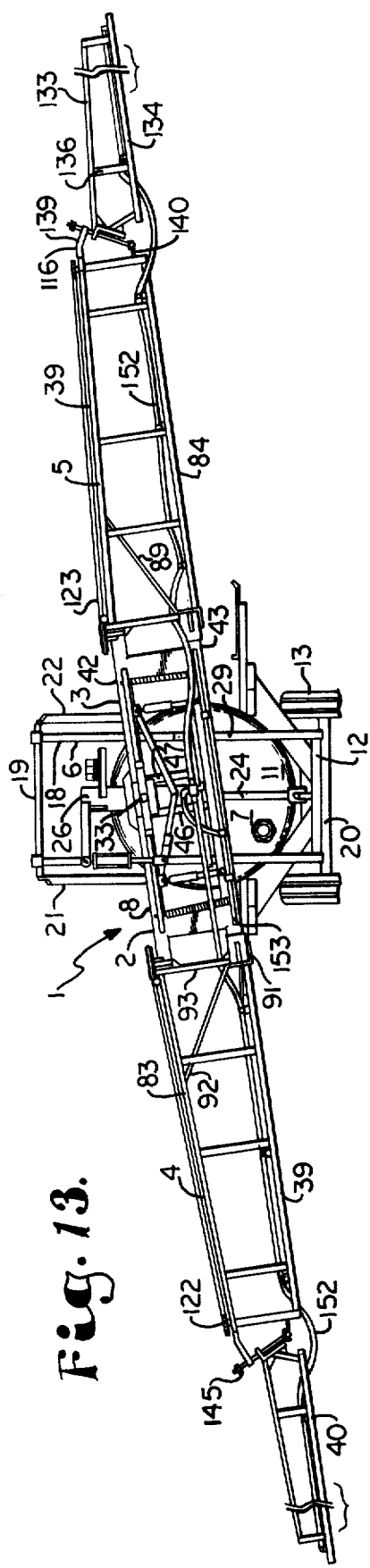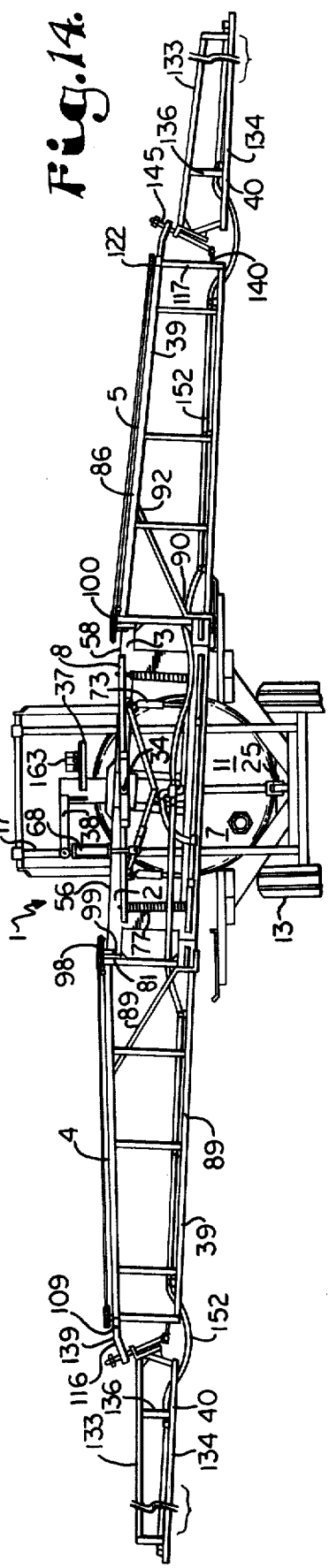

SPRAYER BOOM STRUCTURE

This invention relates to booms for supporting spray hoses and the like, and in particular, to an elongate spray boom mounted to a transport vehicle for agricultural spraying purposes.

For agricultural spraying, it is desirable to broadcast material over as large an area as possible during a single pass of the transport vehicle because operator and equipment time is conserved and soil compaction caused by the vehicle tires is restricted to as small an area as possible. Moreover, particularly when spraying material such as herbicide from roads, it is desirable to reach over as wide an area as possible to reduce the growth of undesired vegetation.

A downwardly inclined shoulder and ditch often parallels the road surface whereby a horizontal boom structure is often elevated a considerable distance above the vegetation to be sprayed. However, it is desirable to spray as close to the surface of the vegetation as possible to reduce wind drift which wastes the chemical and that sometimes permits the herbicide or the like to damage crop plants.

Heretofore, agricultural spraying units have not been tiltable from side to side to allow close application and, when encountering a downsloping surface, the spray is usually dispensed a considerable distance above the vegetation. Conversely, when encountering an upslope, the spray boom ends sometimes tangle in vegetation and hit against the ground of the upslope surface, sometimes with damaging results.

During movement of such large boom structures, considerable jouncing and jolting of the boom is encountered as the transport vehicle moves over uneven or rough terrain. This shock movement can cause damage over a period of time to the boom structure and crack strained hinges and bearings and even bend structural members. To counter this, manufacturers have typically reinforced the boom structure by providing extra heavy duty material and additional strenghtening braces, ribs and the like with the end effect that the boom structure is quite heavy. As boom structures in the order of 60 to 90 feet total width are often provided, considerable weight is often reached.

The principle objects of the present invention are: to provide a spray boom assembly adapted for mounting on a transport vehicle and which may extend for total transverse distances of 60 to 90 feet or even more; to provide such a spray boom assembly including shock absorber structure for absorbing and dampening shock transients; to provide such a spray boom assembly which is relatively light in weight; to provide such a spray boom assembly which is selectively tiltable from side to side; to provide such a spray boom assembly which is tiltable from side to side while retaining shock absorbing capability; to provide such a spray boom assembly which is tiltable by means of a remotely controlled hydraulic ram; to provide such a spray boom assembly having selectively tiltable inner and outer wing sections connected to a center boom structure; to provide such a spray boom assembly in which an outer wing section is automatically foldable relative to an inner wing section; to provide such a spray boom assembly having a translational to rotational movement arrangement which automatically folds and unfolds the outer wing section relative to the inner wing section upon folding and unfolding of the inner wing section to the center section; to provide such a spray boom assembly having an outer wing section including a swing-away hinge for encountering obstacles in the field; to provide such a spray boom assembly which is compactly foldable for transport over a road surface; and to provide such a spray boom assembly which is relatively inexpensive, sturdy and efficient in use and particularly well adapted for the intended purpose.

Other objects and advantages of this invention will become apparent from the following description taken in connection with the accompanying drawings wherein is set forth, by way of illustration and example, a certain embodiment of this invention.

FIG. 1 is a plan view of a spray boom assembly embodying the present invention and shown mounted to a transport vehicle and with outwardly extended boom wing sections.

FIG. 2 is a side elevational view of the spray boom assembly in folded relation upon the transport vehicle.

FIG. 3 is a top plan view of the spray boom assembly in folded relation on the transport vehicle.

FIG. 5 is a fragmentary, rear elevational view of the spray boom assembly mounted on the transport vehicle and shown in a lowered position.

FIG. 6 is an enlarged sectional view showing the mounting of the spray boom assembly to a center pivot arrangement.

FIG. 7 is an enlarged, fragmentary view of the spray boom structure and illustrating shock absorbing means extending between frame sections.

FIG. 8 is a plan, fragmentary view of the juncture between the spray boom center section and inner wing section.

FIG. 9 is an enlarged, fragmentary view of an operator's control panel for the spray boom assembly.

FIG. 10 is an enlarged, fragmentary plan view showing folding of the inner and outer boom wing sections relative to each other and to a boom center section.

FIG. 11 is an enlarged, fragmentary elevational view of the connection between a boom center section and inner wing section depicting a portion of a cable and pulley means for folding actuation.

FIG. 12 is an enlarged, fragmentary elevational view of the juncture between inner and outer boom wing sections and showing another portion of a translational to rotational movement arrangement and a swing-away hinge structure.

FIG. 13 is a rear elevational view of the spray boom assembly and illustrating tilting thereof in the first direction.

FIG. 14 is a rear elevational view of the spray boom assembly and depicting the reaction of the boom to shock loading and stresses imposed during transport over a field.

FIG. 15 is a rear elevational view of the spray boom assembly and showing tilting thereof in a second direction.

Figure 4:
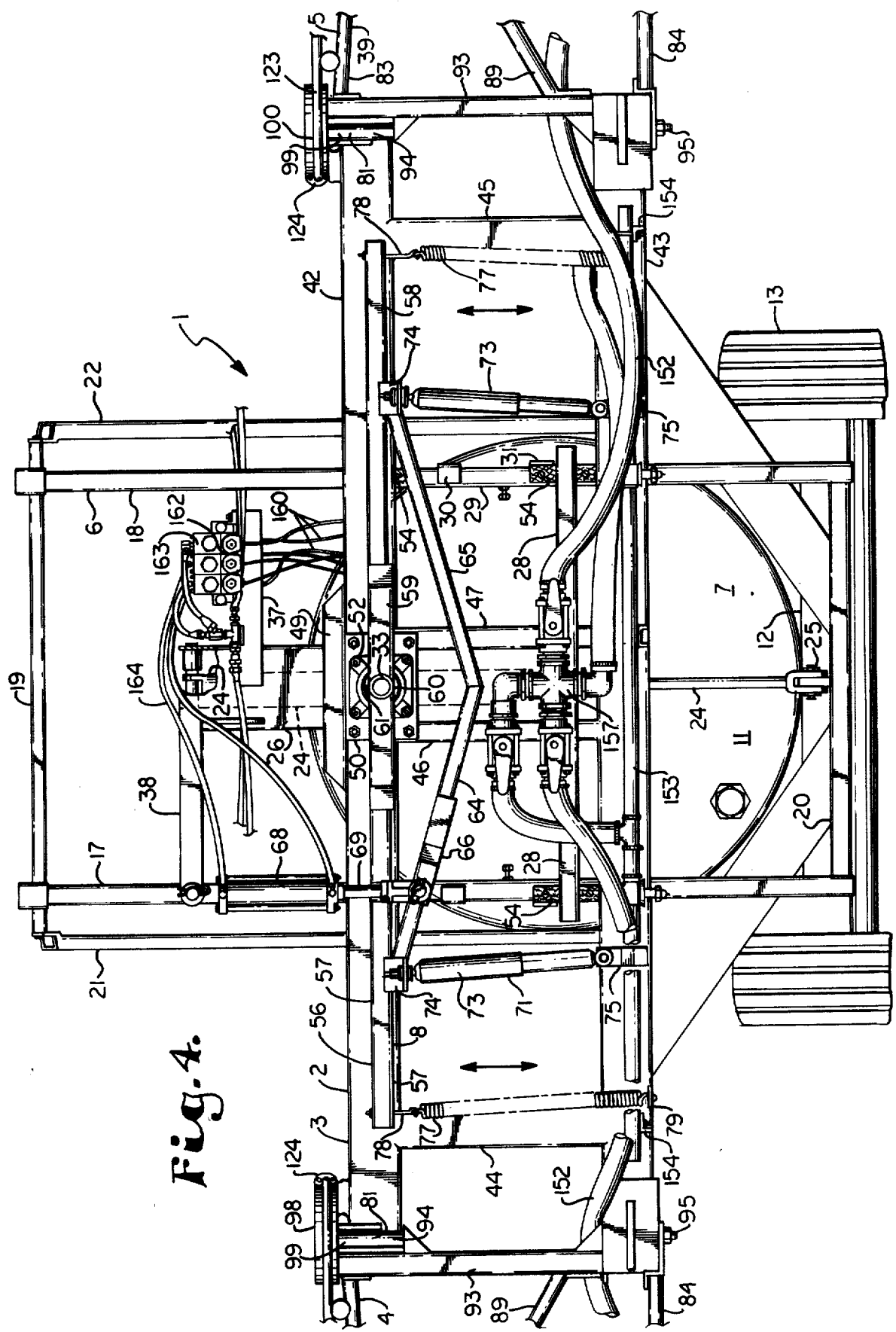
FIG. 4 is an enlarged, fragmentary, rear elevational view of the spray boom assembly mounted upon the vehicle.

As required, a detailed embodiment of the present invention is disclosed herein, however, it is to be understood that the disclosed embodiment is merely exemplary of the invention which may be embodied in various forms, therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail

The reference numeral 1 generally indicates a spray boom assembly embodying the present invention. The spray boom assembly 1 includes a spray boom 2 having a center section 3 and outwardly extending opposite wing sections 4 and 5 hinged together for folding and unfolding relative to the center section 3. The spray boom 2 is mounted upon a frame 6 attached to a transport vehicle 7 by a pivot means, described below, which permits the spray boom 2 to rotate in a vertical plane and swing up and down on opposite ends thereof.

A biasing frame 8 is pivotally mounted with the spray boom 2 to the transport vehicle frame 6 and has shock absorber means extending between the biasing frame and the boom center section for absorbing shock transients and dampening rotative movement. The biasing frame 8 is selectively positionable with respect to the transport vehicle frame 6 for tilting the spray boom 2 from side to side, as described below, while retaining shock absorbing capabilities.

To enable folding of the wing sections 4 and 5, motive means and a translational to rotational movement arrangement extends between the wing sections with the latter automatically operating to cause folding of inner and outer sections of the wing. Each wing section 4 and 5 also includes a swing-away hinge structure for operation upon encountering obstacles in the field to prevent damage to the outer ends of the wings.

The transport vehicle 7 may be a truck, tractor, or the like and, in the illustrated example, is a trailer adapted to be drawn by a tractor. The transport vehicle 7 includes a spray material tank or reservoir 11 mounted atop a subframe structure 12 with wheels 13 for moving over an earth surface. As is conventional, the transport vehicle 7, FIGS. 1 through 3, has a motor and pump arrangement 14 providing spray material under pressure through hoses and conduits, described below, for broadcast over a field. In the illustrated example, a draw tongue 15 is provided for connection to a drafting vehicle such as a tractor whereby the tractor hydraulic system provides hydraulic fluid under pressure suitable for operation of the motor and pump arrangement 14 and various hydraulic rams used in connection with the spray boom assembly 1 as described below.

Referring to FIG. 4, the spray boom mounting frame 6 of the transport vehicle 7 includes spaced upright frame members 17 and 18 with upper and lower cross members 19 and 20 and opposite side braces 21 and 22. A fluid pressure or hydraulic ram 24 includes a clevis end 25 at a lower end connected to the lower cross member 20. An upper end of the hydraulic ram 24 is positioned in a beam structure 26 which raises and lowers within the framework formed by the frame members 17 and 18 and cross members 19 and 20 in response to extension and retraction of the hydraulic ram 24.

A cross beam 28 is affixed to a lower portion of the beam structure 26 and has opposite ends extending to and slidably attached to the opposite frame members 17 and 18. Spaced ends of the cross beam 28 have slide arms 29 attached thereto with brackets 30 and 31 engaging opposite sides of the respective frame members 17 or 18 to position the beam structure 26 in upright relationship between the frame members 17 and 18.

A pivot means 33 includes an elongate, cylindrical pin 34, FIG. 6, affixed to the beam structure 26 at a medial portion therealong and reinforced by suitable braces 35 whereby the pivot means 33 moves vertically with the beam structure 26. Also attached to and moving vertically with the beam structure 26 are an outwardly extending arm 37 carrying a plurality of control circuit devices described below and an oppositely outwardly extending L-shaped arm 38, FIG. 4, for attachment to a boom tilting means described below.

The spray boom 2 is pivotally attached to the pivot means 33 at the center section 3. In the illustrated example, the spray boom 2 includes the center section 3 and the opposite wing sections 4 and 5 respectively include inner wing sections 39 and outer wing sections 40 hingedly interconnected for folding between the inner and outer wing sections 39 and the center section 3. The exemplary center section 3 has upper and lower beam members 42 and 43, opposite end upright members 44 and 45 joined to the upper and lower beam members 42 and 43 and medially located, spaced upright members 46 and 47 also secured to the upper and lower beam members 42 and 43. Preferably, the members 42 through 47 are of all sturdy, box beam steel construction able to withstand heavy loading and stresses occuring therein during operation of the spray boom assembly 1.

The illustrated upper beam member 42 is not continuous but, as shown in connection with FIG. 4, has a central opening or gap with confronting ends joined by a bridging beam 49 to comprise a unitary structure. Spaced, front and rear plates 50 and 51 are secured, as by bolting and welding, to the confronting gap end portions of the upper beam member 42 and the upper portions of the spaced upright members 46 and 47 and contain suitable internal bearings for smooth rotational mounting to the pivot pin 34. Bearing members 52 connect to the plates 50 and 51 and preferably, provide roller bearings for long life during high abrasive agricultural dust conditions. Outwardly of the bearing plates 52, the pivot pin 34 projects rearwardly for pivotally mounting the biasing frame 8 thereto.

The center section 3 is pivotally suspended on the pivot pin 34 for rotation in a vertical plane and whereby remote ends of the wing sections 45 may swing upwardly and downwardly, FIGS. 13 through 15. Further, the spray boom 2 can be elevated or lowered in response to the operation of the hydraulic ram 24 whereby the boom center section 3 slides upwardly and downwardly on the transport vehicle frame 6. Rub pads and spacers 54 and 56, are affixed to the frame members 17 and 18 and alleviate undesired wear and noise between the facing boom and frame members.

The biasing frame 8 is pivotally affixed to the pivot pin 54 and, in the illustrated example, includes an elongate, transversely extending upper beam 56 with opposite end portions 57 and 58. The upper beam 56 has a medial space or gap and the confronting ends are joined by a horizontally extending bridging beam 59 to form an integral beam. The bridging beam 59 has a medial bearing sleeve 60 sized for receipt of the pivot pin 34 and an end lock 61, such as a set bolt, extends through the bearing sleeve for engagement with the pivot pin 34 to prevent inadvertent disassembly of the biasing frame 8 from the pivot pin 34.

Downwardly extending brace beams 64 and 65 converge to form a connection, which are secured together by welding or the like to form a V-shaped brace for the opposite end portions 57 and 58. A fastening bracket 66 is affixed to the brace beam 64 and is generally located vertically under the remote end of L-shaped arm 38. Means extend between the biasing frame 8 and the frame 6 of the transport vehicle 7 and, in the illustrated example, the means include a hydraulic ram 68 having upper and lower cylinder and piston ends respectively connected to the remote end of the L-shaped arm 38 and the fastening brackets 66. Upon extension and retraction of the piston 69, the biasing frame 8 rotates about the pivot pin 34 and stops in an operator selected position.

Shock absorber means 71 extend between the biasing frame 8 and the spray boom center section and, in the illustrated example, include a conventional sealed reservoir shock absorber 73 positioned adjacent the juncture of each of the brace beams 64 and 65 with the upper beam 56 and having an upper end attached to a bracket 74 secured to the upper beam 56 and a lower end secured to a bracket 75 secured to the boom center section lower beam member 43. Positioned outwardly of the shock absorbers 73 are further shock absorber means 71 including a coil spring 77 having an upper end attached to an eye bolt 78 secured to the remote end of the end portion 57 or 58 and a coil spring lower end affixed to a mounting bracket 79 also secured to the lower beam member 43. Thus, the shock absorber means 71 interconnect the biasing frame 8 with the spray boom 2 whereby the transport vehicle frame 6 is interconnected with the biasing frame 8 by the hydraulic ram 68.

Upon movement over a field, FIGS. 13 through 15, the spray boom 2 and 3 reacts to jolts and shocks in the field by tending to rotate about the pivot means 33, said rotation being snubbed or dampened by the shock absorber means 71. The shock absorbers 73 are effective to dampen compressive movement and the coil springs 77 are effective to dampen tensional movement between the biasing frame 8 and the boom center section 3. In the example shown in FIG. 14, the biasing frame 8 is being maintained in a level attitude by the selected positioning of the hydraulic ram 68 and the spray boom 2 is shown in reaction to irregularities in the terrain by tending to swing the left wing section 4 upwardly and the right wing section 5 downwardly. The shock absorber 73 on the left end portion 57 compresses and provides a dampening action and simultaneously, the coil spring 77 on the right end portion 58 extends to snub tensional movement. Additionally, the remaining shock absorbers 73 and coil springs 77 also provide snubbing action. Thus, rotational movement of the spray boom 2 is dampened by the shock absorber means 71 and the shock absorber means absorb and accomodate stress which would otherwise tend to damage the spray boom 2.

To enable the spray boom 2 to be tilted to one side or the other, FIGS. 13 and 15, the hydraulic ram 68 is selectively operated to an extended or contracted position whereby, upon extension, FIG. 13, the biasing frame 8 tends to rotate upon the pivot means 33 and the left end portion 57 is lowered and the right end portion 58 is raised. The spray boom 2, through the connection of the shock absorber means 71, tends to rotate therewith and the entire spray boom 2 is moved into a tilted position. Conversely, upon retraction of the hydraulic ram piston 69, FIG. 15, the left end portion 57 is pulled upwardly beyond a horizontal position and the right end portion 58 is lowered. The shock absorber means 71 tying the spray boom 2 to the biasing means 8 cause the spray boom 2 to rotate therewith whereby the right end of the spray boom 2 is tilted downwardly and the left end is raised. Regardless of the tilted position of the biasing means 8, the shock absorber means 71 provide shock dampening action to accomodate jolts and jouncing of the spray boom 2 during transport and travel over the field surface.

Hinge means 81 swingably interconnect the inner and outer wing sections 39 and 40 and the inner wing sections 39 to the center section 3. In the illustrated example, the inner wing section 39 has upper and lower beam members 83 and 84 each having spaced, parallel members 85 and 86 with a plurality of brace beams 87 arranged in V-shaped, truss relationship and secured horizontally between the parallel members 85 and 86 of each of the beam members 83 and 84. Additionally, transverse braces 88 extend between the members 85 and 86 and are generally positioned at merging apexes of the brace beams 87. An upwardly inclined brace beam 89 extends between the upper and lower beam members 83 and 84 and, in the illustrated example, has a lower end 90 secured adjacent the lower hinge connection 91, FIG. 11, and an upper end 92, FIG. 10, secured to a transverse brace 88 disposed from the hinge means 81. An end beam 93 closes the ends of the upper and lower beam members 83 and 84 adjacent the center section 3 and has bearing sleeves 94 attached thereto and connecting to pivot pins 95 formed in separate upper and lower pivot pins connecting the inner wing section 39 to the center section 3.

An arcuate leverage member such as a cylindrical wheel 98 is secured atop the upper beam 39 of the center section 3 in coaxial relationship with the upper hinge connection 99 between the center section 3 and the inner wing section 39 whereby the wheel 98 does not rotate or move upon folding of the inner wing section 39 relative to the center section 3. A translational to rotational movement arrangement 100 extends between the wheel 98 and portions, described below, connect to the outer wing section 40 to automatically accomplish folding of the outer wing section 40 relative to the inner wing section 39 when the inner wing section 39 is folded relative to the center section 3.

To accomplish folding of the inner wing section 39 relative to the center section 3, a motive means extends therebetween. In the illustrated example, the motive means includes a hydraulic ram 103 having one end 104 connected to the center section 3 and the other end 105 connected to the inner wing section 39. The hydraulic ram 103 is mounted at the opposite ends 104 and 105 by respective outwardly extending lever arms 106 and 107, FIG. 8, and swingably connected thereto. Leverage advantage works to swing the inner wing section 39 relative to the center section 3. The arm 107 is affixed to the inner wing section 39 at the lower hinge section 91 whereby, upon retraction of the ram piston, FIG. 8, the inner wing section 93 is folded relative to the center section 3. Conversely, upon extension of the ram piston, the inner wing section rotates outwardly to an extended or unfolded position, FIGS. 1 and 10.

An outer end 109 of the inner wing section 39 has an upright end beam 110 medially positioned between the base members 85 and 86 respectively of the upper and lower beam members 83 and 84. Upper and lower ears 111 and 112 are connected to the inner wing section outer end 109 and extend laterally in offset relationship to the upright end beam 112 and are generally positioned in alignment with the members 86 of the upper and lower beam members 83 and 84. An elongate pivot pin 114 extends between the upper and lower ears 111 and 112 to provide a hinge connection for the outer wing section 40.

An inner end 116 of the outer wing section 40 has a triangularly shaped end plate 117 connected to upper and lower ears 118 and 119 with the lower ear 119 resting upon the lower ear 112 of the inner wing section 39 for support. The pivot pin 114 extends through the upper and lower ears 118 and 119 and pivotally connects the outer wing section 40 to the inner wing section 39. The medially offset position of the pivot pin 114 permits the inner end 116 of the outer wing section to abut the outer end 109 of the inner wing section 39 in aligned relationship, FIG. 10 when in the unfolded position and permits the outer wing section 40 to fold parallel against the inner wing section 39, FIG. 3.

To accomplish folding of the outer wing section 40 relative to the inner wing section 39, the translational to rotational movement arrangement 100 includes a pulley, such as a toothed sprocket 122, which is secured to the upper ear 118 in coaxial relationship to the pivot pin 114 whereby rotation of the sprocket 122 causes rotative movement of the outer wing section 140 about the pivot pin 114 and thereby folding and unfolding relative to the inner wing section 39. The translational to rotational movement arrangment 100 extends between the wheel 98 and the sprocket 122 and, in the illustrated example, includes a cable portion 123 secured to the wheel 98 as by a clamp 124. The cable portion 123 extends about the wheel 98 and has opposite ends connected through an eye arrangement 125 to spaced elongate rods 126 and 127. The rods 126 and 127 extend substantially the full length of the inner wing section 39 and connect to opposite ends of a roller chain 129 in engagement with the teeth of the sprocket 122.

Because the wheel 98 is affixed to the end of the center section 3 and the sprocket 122 is affixed to the end of the outer wing section 40, as the inner wing section 39 is swung between folded and unfolded positions by the hydraulic ram 103, the translational to rotational movement arrangement 100 tends to automatically swing the outer wing section 40 into position. The securement of the cable portion 123 to the wheel 198 draws the rods 126 and 127 back and forth in translational movement as the inner wing section 39 rotates relative to the wheel 98 to draw the roller chain 129 back and forth. As the roller chain 129 is drawn, the sprocket 122 rotates to cause swinging of the outer wing section 40. Adjustment of the working lengths of the rods 126 and 127 is accomplished through adjustment means such as turnbuckles 130 for proper travel of the roller chain 129 and proper positioning of the outer wing section 40 relative to the inner wing section 39 in both folded and unfolded positions.

The outer wing section 40 is triangular in cross-section and has an upper beam member 133 and spaced lower beam members 134 and 135 interconnected by transverse braces 136. A swing-away hinge structure 138 is positioned between the inner end 116 and the beam members 133, 134 and 135 and, in the illustrated example, upper and lower arms 139 and 140 extend outwardly of the triangular end plate 117 in a downward inclination. An upright beam member 142 extends partially between the beam members 133, 134, and 135 and is secured thereto. An ear 143 is inclined upwardly and forms an extension of the upper beam member 143 and is generally positioned in alignment with the upper and lower arms 139 and 140. A pivot pin 145 extends through the aligned upper and lower arms 139 and 140 and ear 143 to pivotally connect the beam members 133, 134 and 135 to the outer wing section inner end 116.

A cylindrical, transversely extending member 147 secured to the lower arm 140 with the pivot pin 145 extending therethrough and secured at upper and lower ends as by fasteners. A length of channel beam 148 is mounted atop the cylindrical transverse member 147 with the flange portion cradling the same and the channel beam 148 is secured transversely to the beam member 142. The coil spring 150 is sleeved around the pin 145 and fixed in position to bear downwardly upon the channel beam 148.

The swing-away hinge structure 138 acts as a centering mechanism to urge the outer portions of the outer wing section 40 into straight alignment with the outer wing section inner end 116. The channel beam 148 cams upon the cylindrical transverse member 147 for directional alignment. Upon encountering an obstacle, the outer portion of the outer wing section places rotational force upon the channel beam 148 whereby the flanges thereof tend to ride upwardly upon the cylindrical transverse member 147, overcoming the compressional force of the coil spring 150. After passing the obstacle, the coil spring 150 urges the channel beam 148 into parallel relationship with the cylindrical transverse member 147 and thereby positions the outer portion of the outer wing section 40 again straight outwardly.

For spraying operations, the spray boom 2 is provided with a plurality of conduits 152 which respectively extend the lengths of the wing sections 4 and 5. A conduit 153 extends the length of the boom center section 3 and is mounted on spaced supports 154 and extended outwardly of the lower beam member 43. Nozzles 155 are positioned at intervals along the conduits 152 and 153 for distribution of the spray material. Spray materials is routed from the tank or reservoir 11 by the motor and pump arrangement 14 and through a valve 157 mounted to the boom center section 3.

Elevation and lowering of the spray boom 2, tilting, and folding and unfolding actions are, in the illustrated example, provided by the appropriate hydraulic rams and translational to rotational movement arrangement 100 as regulated electrically through an operator's control panel 159, FIG. 9, having electrical wires 160 connected to the bank of solenoids 162 mounted on the arm 37. The solenoids 162 control movement of the hydraulc valves 63 to direct fluid through hydraulic conduits 164 to the appropriate rams. Preferably, the operator's control panel 159 is conveniently positioned for the operator, such as adjacent the tractor seat and electrical wires 160 extend therefrom back to the spray boom mounting area. Switches 165, such as the joy stick type, are provided for manipulation and control of the hydraulic valves.

It is to be understood that while one form of this invention has been illustrated and described, it is not to be limited to the specific form or arrangement of parts herein described and shown, except insofar as such limitations are included in the following claims.

What is claimed and desired to secure by Letters Patent is:

1. A spray boom assembly comprising:
  (a) an inner frame adapted for mounting to a transport vehicle;
  (b) an elongate spray boom having a center portion and opposite ends, said center portion being mounted to said frame in facing relationship;

(c) a pivot means connected to and extending through said inner frame and said center portion and permitting up and down swinging movement of said spray boom about said pivot means in response to movement of said vehicle;

(d) a biasing frame facing said inner frame and said center portion and affixed to said pivot means for rotation thereabout;

(e) means extending between said inner frame and said biasing frame and positioning said biasing frame at a rotational attitude relative thereto; and (f) shock absorber means connected to and extending between said spray boom center portion and said biasing frame for absorbing rotational transients and limiting rotation of said spray boom about said pivot means.

2. The spray boom assembly set forth in claim 1 wherein:

(a) said means extending between said inner frame and said biasing frame are adjustable means providing a plurality of selective positions of rotational attitude of said biasing frame relative to said inner frame.

3. The spray boom assembly set forth in claim 2 wherein:

(a) said adjustable means include an arm extended outwardly of said inner frame and having a power fluid responsive ram operably connected thereto and to said biasing frame;

(b) whereby said ram is expansible and contractible to rotate said biasing frame about said pivot means.

4. The spray boom assembly set forth in claim 1 wherein:

(a) said inner frame includes spaced, upright frame members and cross frame members supporting a first power fluid ram positioned between said upright frame members;

(b) said pivot means is connected to said cross frame members supporting said power fluid ram whereby said ram is expansible and contractible to raise and lower said spray boom and said biasing frame relative to said vehicle.

5. The spray boom assembly set forth in claim 4 wherein:

(a) said means extending between said inner frame and said biasing frame include an arm connected to and extending from said inner frame and a second power fluid ram extending from said arm to said biasing frame at a position thereon spaced laterally from said pivot means;

(b) whereby said second power fluid ram is expansible and contractible to rotate said biasing frame about said pivot means and position said biasing frame in a tilted attitude.

6. The spray boom assembly set forth in claim 1 wherein:

(a) said shock absorber means include tension and compression resistant members extending between and connected to said biasing frame and said center portion at respective positions spaced laterally from said pivot means.

7. The spray boom assembly set forth in claim 6 wherein:

(a) said tension and compression resistant members include a coil spring member and a sealed cylinder and piston ram member respectively having opposite ends connected to said biasing frame and said center portion.

8. The spray boom assembly set forth in claim 6 wherein:

(a) said tension and compression resistant members include two sets thereof each said set including one said coil spring member and one said sealed ram member, each said set being positioned on opposite sides of said pivot means.

9. A spray boom assembly comprising:

(a) an inner frame mounted upon a transport vehicle and having a first power fluid ram mounted therein in upstanding relationship;

(b) an elongate spray boom having a center section and outwardly extending wing section, said center portion being mounted against said inner frame in facing relationship and having opposite end portions;

(c) a pivot mount including a pin member connected to and extending from said inner frame and through said center section, said center section having a bearing means pivotally mounting said center section to said inner frame via said pivot mount; said pivot mount being operably connected to said first power fluid ram for raising and lowering of said spray boom relative to said vehicle;

(d) a biasing frame having opposite end portions facing each inner frame and said center section and including a bearing means pivotally mounting said biasing frame to said inner frame via said pivot mount for rotation thereabout;

(e) a second power fluid ram and support arms therefor extending between and connected to said biasing frame and said inner frame and spaced from said pivot means, said second power fluid ram being extensible and contractible to tilt said biasing frame sidewardly relative to said inner frame in a generally upright plane; and (f) spaced sets of tension and compression resistant members extending between said biasing frame and said center section, said sets respectively including a coil spring and a sealed ram member for absorbing rotational and shock transients and maintaining said center section at a rotational attitude relative to said biasing frame;

(g) whereby said biasing frame is rotatable through operation of said second power fluid ram for sideward tilting, thereby urging said center section into tilted relationship therewith and retaining shock absorbency therebetween.

* * * * *